Aug. 10, 1965   H. F. LUKAS, JR   3,199,691
CHARGING APPARATUS FOR OPEN HEARTH FURNACES OR THE LIKE
Filed Jan. 29, 1963
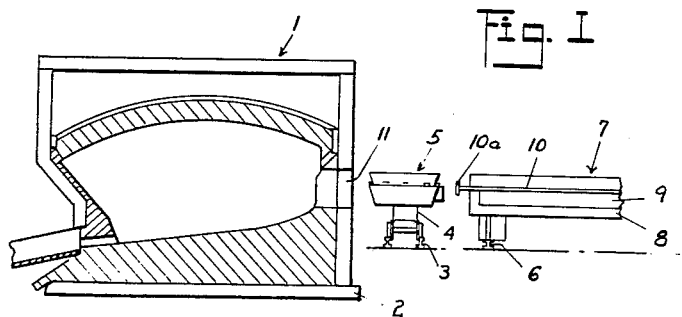
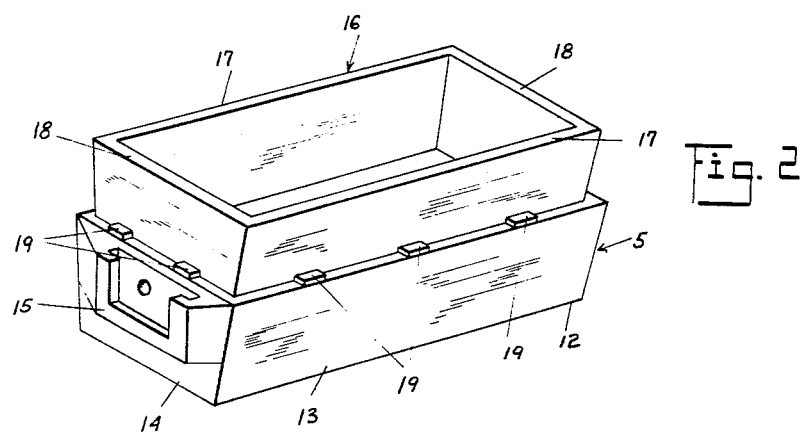
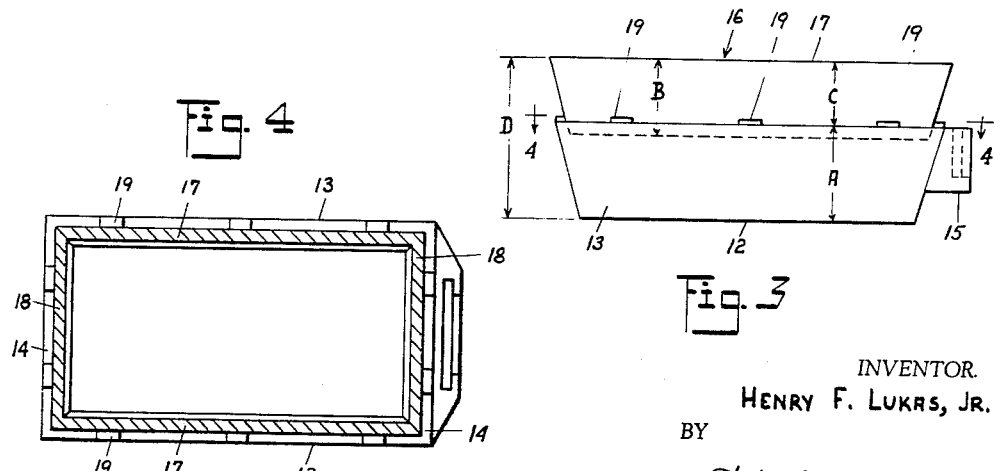
INVENTOR.
HENRY F. LUKAS, JR.
BY
Teare, Tetzer & Teare
ATTORNEYS

United States Patent Office 3,199,691
Patented Aug. 10, 1965

3,199,691
CHARGING APPARATUS FOR OPEN HEARTH
FURNACES OR THE LIKE
Henry F. Lukas, Jr., 6936 Farview Road,
Brecksville, Ohio
Filed Jan. 29, 1963, Ser. No. 254,685
4 Claims. (Cl. 214—26)

This invention relates to open hearth furnace operations and more particularly relates to apparatus for charging open hearth furnaces.

One method for charging an open hearth, is to fill a charging box supported on a movable buggy with a load of open hearth stock, lift the filled charging box from the buggy and move the box into the open hearth furnace, rotate the charging box therein by means of a charging machine to discharge the open hearth stock into the furnace, and then withdraw the charging box from the furnace in preparation for another charging cycle. It is apparent that plant layouts including a large number of open hearth furnaces and supplied from several charging machines also incorporate a major transportation and materials handling problem. Even with efficient operation and closest coordination in transportation, many hours are consumed between furnace heats due to the time consuming charging operations, especially when bulk scrap materials are utilized as part of the open hearth charge.

Moreover, because of the limitation of presently existing plant facilities, common size charging boxes are not adequate in providing maximum charging efficiency between heats. In many cases, subsequent charging operations are sometimes necessary to fill the open hearth with metal before it is economically practical to tap the heat.

Accordingly, a principal object of the present invention is to provide an improved charging box construction of increased capacity as compared to those heretofore known, and yet which can be economically utilized with presently existing plant facilities.

Another object of the present invention is to provide an improved charging box construction of any relative size, but which is quickly adjustable to various heights as compared to corresponding standard size heretofore known charging boxes.

A further object of the present invention is to provide a simplified construction of a material retaining frame which is relatively economical to produce, and which is adapted to be utilized with a conventional size charging box to substantially increase the charging capacity of such charging box when utilized in charging open hearth furnaces.

A still further object of the present invention is to provide an expendable material retaining frame comprised of scrap metal or the like which is adapted to be utilized with a charging box to substantially reduce the time consumed between heats in charging a blast furnace, and which may be advantageously deposited in the open hearth furnace as a part of the furnace charge.

Other objects and advantages of the present invention will be apparent from the following description taken in conjunction with the accompanying drawings:

FIG. 1 is a fragmentary side elevational view, partially in section, showing a conventional plant layout for charging an open hearth furnace;

FIG. 2 is an enlarged perspectvie view showing the expendable material retaining frame of the present invention juxtaposed in position for use on a charging box of conventional construction as shown in FIG. 1;

FIG. 3 is a side elevational view of the expendable material retaining frame and charging box shown in FIG. 2; and FIG. 4 is a cross-sectional view taken along the plane of line 4—4 of FIG. 3.

Referring now again more particularly to FIG. 1 of the drawings, the open hearth furnace designated generally at 1, may be of conventional construction and positioned at a convenient area of the charging floor 2, which may be generally elevated above the general yard level. On the charging side of the furnace 1, may be laid a track 3 for use with a yard locomotive (not shown) and buggies 4 for carrying the charging boxes designated generally at 5. Parallel to the aforementioned track 3 extends a very wide-gauge track 6 on which operates a charging machine 7 of conventional construction. The number of such charging machines will vary in each case dependent upon the number of furnaces in operation on the floor and the size of the existing plant facilities.

In general, the charging machine may include a heavy duty frame 8 supported for movement on the wide-gauge track 6, a charging carriage 9 which is supported on rails (not shown) carried by the frame 8 for moving the charging machine transversely or at right angles to the track 6, and an elongated charging bar 10 mounted on the carriage and adapted to be moved into and out of the furnace 1 through a charging door opening 11.

In the embodiment illustrated, the charging bar 10 is preferably of conventional construction being suitably formed at one end 10a thereof for engagement with the customary connecting means 15 on the charging box 5. The charging bar 10 is pivotally supported and rotatably journaled on the charging machine 7 in the customary manner, such that the charging box 5 may be conveniently lifted from its supporting buggy 4, moved into the furnace via the charge door opening 11, and rotated about its horizontal axis to discharge its load within the furnace. By reversing the aforementioned operations, the charging box 5 may again be placed on the buggy 4, the charging machine 7 and an entire series of charging boxes moved along the tracks 3 and 6 until the next loaded box is opposite the next successive furnace opening, and the operation repeated to complete another charging operation.

As shown in FIGS. 2 to 4 inclusive of the drawings, the present invention contemplates the provision of a charging box 5 adapted for movement into and out of an open hearth furnace by means of the associating charging bar 10, as aforementioned. In the form illustrated, the charging box 5 may be of a generally inverted truncated, in side elevation, open-topped construction having a generally flat bottom 12, a pair of upwardly and outwardly extending side walls 13, and a pair of upwardly and outwardly extending end walls 14 joined together with the side walls at the respective corners thereof to define an open topped enclosure therewith. One of the end walls, preferably has the customary connecting means 15 extending therefrom for interconnecting engagement with the forward end of the charging bar 10, as aforesaid. The charging box 5, in the embodiment illustrated, may be of a conventional size having an average height of about 25¾ inches in interior dimension and about 26¾ inches A in exterior dimension, such as to have an average charging capacity of between about 20 cubic feet to 40 cubic feet.

The charging box 5, in the embodiment illustrated, is adapted to be surmounted by an expendable or disposable material supporting insert or frame, designated generally at 16. The frame 16, as the corresponding charging box 5, is preferably of an inverted truncated, in side elevation, construction, but which is open both at the top and the bottom. The frame 16 is preferably defined by a pair of opposite disposed upwardly and outwardly extending side walls 17 and a pair of upwardly and outwardly extending end walls 18. The respective side 17 and end walls 18 may be formed to contour as a unit and joined together at one corner or alternatively they may be individually joined together at all four corners, such as by welding or the like, as is known in the art, to provide the expendable material retaining enclosure of the present invention.

It is contemplated in the present invention that the contour and outside dimension of the frame 16 be determined such that the frame may be quickly juxtaposed over and positioned downwardly a sufficient distance within the open top portion of the corresponding charging box 5, thereby preventing the frame from inadvertently tipping or shifting when assembled with the associated charging box in normal use thereof.

The side 17 and end 18 walls of the frame may be provided with spaced lugs 19 extending outwardly therefrom which may be made integral, such as by welding or the like, to the respective side and end walls. The lugs 19 serve as stop or abutment means for limiting downward movement of the frame 16 when positioned within the corresponding charging box 5. By such an arrangement, in the assembled position, the protruding lugs 19 rest on the upper marginal edges of the respective sides 17 and end 18 walls of the charging box, thereby automatically positioning the frame 16 at the predetermined desired depth within the charging box.

The expendable frame 16 in the embodiment illustrated, may preferably be of an average height of about 21¼ inches, as shown at B, in outside dimension, such that it may be quickly positioned to extend downwardly about three inches within the upper portion of the corresponding charging box, as determined by the aforementioned location of lugs 19. Moreover, in the assembled position, the expendable frame 16 adds about 18¼ inches in outside dimension to the average height of the charging box 5, as shown at C, and provides an average overall height of about 45 inches, as shown at D, in outside dimensions to the combined charging box and expendable frame 16. Accordingly, by increasing the overall average height of the charging box 5, to about 45 inches in outside dimension, in the manner prescribed, there is achieved a net gain of approximately 70% in the average height of the charging box, and still be less than the normal height of a furnace door opening. In the aforementioned charging box, having an average height of about 26¾ inches shown at A, this approximate 70% net gain in the average height of the box, results in a charging capacity of between about 34 cubic feet and 68 cubic feet. Such net gain in average height results in an increased charging capacity of between 14 cubic feet and 28 cubic feet, as compared to conventional sizes boxes having charging capacities of between about 20 cubic feet and 40 cubic feet, as aforesaid. This improvement over existing facilities proportionately reduces the time heretofore required in charging materials into the open hearth furnace. Accordingly, such saving from charge to tap time, substantially increases the number of heats yielded by the open hearth furnace, which results in a greater number of tons of steel per furnace per day in normal production.

In accordance with the present invention, the expandable frame 16 may be formed from any material compatible with the open hearth process. Moreover, because of the flexibility of the open hearth process, it permits the use of all types of steel scrap, light and bulky, heavy and dense, dirty and clean, to produce high grade steel of any chemical analysis. Moreover, the expendable frame 16 may be formed of steel scrap and advantageously deposited as part of the scrap charged into the open hearth furnace.

As an example of one application of the present invention, the expendable frame 16 may be juxtaposed in position on a corresponding charging box 5 and expendable frame 16 thereon is then filled with an open hearth charge, such as for example limestone, iron ore and scrap, and moved into position in front of an open hearth via the supporting buggy 4. The charging box 5 may then be lifted from its supporting buggy by means of the charging machine 7 and moved into the furnace through the charging door 11. Upon actuation of the charging bar 10, the charging box 5 may be rotated to deposit the charge including the expendable frame 16 within the furnace. The charging box 5 may then be withdrawn from the furnace and another expendable insert positioned thereon in preparation for another charging cycle.

While for purposes of disclosure, I have selected to illustrate and describe the expendable frame 16 as being of a generally inverted truncated-shaped construction, it is to be understood that other constructions, such as for example square, rectangular, rounded or the like may also be advantageously utilized in accord with the principles of the present invention.

The terms and expressions which have been used are terms of description and not of limitation, and there is no intention in the use of such terms and expressions of excluding any equivalents of any of the features shown and described, or portions thereof, but it is recognized that various modifications are possible within the scope of the invention claimed.

I claim:

1. In an open hearth charging apparatus the combination comprising, an open top charging box having a bottom portion and enclosing side and end wall portions extending upwardly from said bottom portion, a material retaining frame having open top and bottom portions and being of a size so as to be removably supported within said charging box, said frame being comprised of an expendable material, such as a scrap steel or the like, so as to be disposed as part of the charge into an open hearth furnace, and a plurality of spaced members extending from said frame and removably supporting the latter at a predetermined depth within said charging box for substantially increasing the load capacity of said charging box.

2. In an open hearth charging apparatus the combination comprising, an open top charging box having a bottom portion and upwardly and outwardly extending side and end wall portions defining a generally inverted truncated, in side elevation configuration, a material retaining frame having open top and bottom portions, said frame having corresponding upwardly and outwardly extending side and end wall portions, defining a generally inverted truncated, in side elevation configuration, and being of a size to be removably nested within said charging box, said frame being comprised of an expendable material, such as scrap steel or the like, so as to be disposed as part of the charge in an open hearth furnace, and a plurality of spaced lugs extending from said frame and engageable with said charging box for removably supporting the frame at a predetermined depth interiorly of said charging box.

3. In an open hearth charging apparatus, a generally open top charging box having a flat bottom portion and enclosing side walls extending from said bottom portion, an expendable material retaining frame, said frame being open at its top and bottom and being of a size to be received within the open top portion of said charging box, retaining means extending from said frame for supporting it on the enclosing side walls of said charging box, and said frame comprised of a material compatible with an open hearth charge for disposition as part of the charge into an open hearth furnace.

4. An expendable material retaining frame for use with an open hearth charging box, said frame being open at its top and bottom and being of a size to be supported within the open top portion of said charging box, said frame being comprised of a material compatible with an open hearth charge for disposition as part of the charge in an open hearth furnace.

References Cited by the Examiner
UNITED STATES PATENTS

| | | | |
|---|---|---|---|
| 1,771,761 | 7/30 | Allison | 214—26 |
| 2,688,418 | 9/54 | Carter | 220—4 |
| 2,738,904 | 3/56 | Poynor | 220—8 XR |
| 3,120,248 | 2/64 | Gregory | 141—1 |

HUGO O. SCHULZ, *Primary Examiner.*